(12) United States Patent
Chase et al.

(10) Patent No.: US 8,762,741 B2
(45) Date of Patent: Jun. 24, 2014

(54) PRIVACY-PRESERVING COMMUNICATION

(75) Inventors: Melissa E. Chase, Seattle, WA (US); Sze Ming Chow, New York, NY (US); Seny Fakaba Kamara, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1138 days.

(21) Appl. No.: 12/362,120

(22) Filed: Jan. 29, 2009

(65) Prior Publication Data
US 2010/0191975 A1 Jul. 29, 2010

(51) Int. Cl.
*H04L 29/06* (2006.01)

(52) U.S. Cl.
USPC ........... 713/193; 713/189; 713/190; 713/191; 713/192; 726/27; 726/28; 726/29; 726/30

(58) Field of Classification Search
USPC ........................................................ 713/193
See application file for complete search history.

(56) References Cited

U.S. PATENT DOCUMENTS 7,844,717 B2 * 11/2010 Herz et al. ..................... 709/229
2002/0144153 A1 * 10/2002 LeVine et al. ................ 713/201
2004/0133451 A1 * 7/2004 Kleinschmidt .................... 705/2
2008/0154782 A1 * 6/2008 Kang et al. ....................... 705/74
2008/0189099 A1 * 8/2008 Friedman et al. ................ 704/8

OTHER PUBLICATIONS

Dodis, et al. "A Verifiable Random Function with Short Proofs and Keys." Public Key Cryptography, vol. 3386 of Lecture Notes in Computer Science, pp. 416-431. Springer Berlin, 2005. Heidelberg. [http://citeseer.ist.psu.edu/cache/papers/cs2/589/http:zSzzSzeprint. iacr.orgzSz2004zSz310.pdf/dodis04verifiable.pdf.] Last accessed Mar. 23, 2009, 17 pages.
Katz. "Efficient and Non-Malleable Proofs of Plaintext Knowledge and Applications." [http://citeseerx.ist.psu.edu/viewdoc/summary?doi=10.1.1.10.1654.] Last accessed Mar. 27, 2009, 20 pages.
Belenkiy, et al. "P-signatures and Noninteractive Anonymous Credentials." Theory of Cryptography, vol. 4948 of Lecture Notes in Computer Science, pp. 356-374. Springer Berlin, 2008. Heidelberg. 19 pages.

* cited by examiner

*Primary Examiner* — Longbit Chai
(74) *Attorney, Agent, or Firm* — Stephen A. Wight; Carole Boelitz; Micky Minhas

(57) ABSTRACT

Anonymous information sharing systems and methods enable communication of information to parties in a privacy-preserving manner such that no one other than the designated parties can know the source, recipient, and content of the information. Furthermore, the communication can be accomplished without requiring trial decryption, and protection can be provided against of sharing of privileges.

20 Claims, 14 Drawing Sheets

PRIVACY-PRESERVING COMMUNICATION

BACKGROUND

People often desire to communicate securely and/or anonymously. In other words, individuals would like to ensure information is afforded solely to intended recipients and/or that communication participants are unidentifiable. Reasons for this desire are numerous and varied. For example, sensitive or confidential information can be transmitted between parties such as health and financial information or trade secrets. Alternatively, where information is publically disseminated, the source may want to remain anonymous to avoid consequences associated with the information. Further, anonymity with respect to the author/sender and reader/receiver can be important to avoid user profiling as a function of interactions, for instance. A number of conventional technologies can be employed to facilitate secure and/or anonymous communication including encryption and onion routing, among other things.

Encryption conceals communication content in a manner such that the content is not easily understood by unauthorized individuals. More specifically, encryption is a process of transforming plaintext into ciphertext utilizing a cipher to make the plaintext unreadable by anyone except an individual with special knowledge or a key. Decryption refers to the reverse process in which encryption is removed thereby revealing plaintext, for instance, by applying a known key. By way of example, consider public-key encryption. Here, a public key associated with an intended recipient can be employed by a sender to encrypt a message. The recipient can then use a secret key that corresponds to the public key to decrypt the message.

While communication content can be concealed utilizing encryption, alone this does not afford anonymity. Among other things, unencrypted communication headers might reveal a message destination. Furthermore, even if the header information is encrypted in accordance with an encryption scheme, anonymity is not guaranteed. For example, it is possible that one could determine the public key upon viewing the ciphertext thereby aiding identification of a communication recipient. Additionally, anonymity is difficult to achieve over a network since the routing infrastructure will know the identities of the sender and recipient.

Onion routing facilitates secure and anonymous communication. The basic idea is to protect the privacy of senders and recipients as well as content itself against network traffic analysis and eavesdropping as content travels across a network. The vast majority of network traffic travels along public routes making it relatively easy to observe communications. With onion routing, content can be randomly routed to a destination and encrypted by a sender utilizing public keys associated with path routers or relays. This forms the metaphorical onion. As each router receives this structure, it peels away a layer utilizing its private key revealing routing instructions therefore. The last router removes the final layer and provides the content to the recipient.

Onion routing provides several protections. First, an observer at any given point cannot know where a message came from or where it is going. Further yet, even one of the routers on the path will know nothing more than which routers immediately preceded and followed it on that path. In other words, a single router will not know about the original sender or final recipient. Still further, even if several of these routers pool their information, as long as there is one honest router on the path from sender to recipient, the other routers will be unable to learn anything.

As most techniques, onion routing does not provide perfect protection. However, it does provide a high degree of unlinkability such that an eavesdropper, either on a network or on one of the intermediate routers, cannot easily determine the identity of the sender and receiver. To send a message via onion routing, the sender is required to know the destination address of the recipient beforehand. This may not be public knowledge if the recipient wants to protect his/her anonymity in the network. If the recipient has a static address in the network, the recipient may tell the sender his/her address a priori in some off-band channel, for example, face-to-face communication. However, if the recipient changes addresses frequently keeping all potential senders updated with his current address may be difficult.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to privacy-preserving communication. A communication system or component, such as a server, facilitates anonymous communication between two parties such that no other party can learn anything about the identity of sender or receiver. In particular, messages, content, or the like can be afforded to the communication component with anonymous tags that appear random but in fact specify a recipient. Such a tag can be generated as a function of shared secret information, among other things. The message or communicated content can also be encrypted utilizing this secret information. Encrypted and tagged content can then be securely stored and made available for retrieval by an intended recipient. To acquire this content a user computes and provides a tag to the communication component as well as various proofs that the tag is linked to the user or more specifically their anonymous identity or pseudonym. Once satisfied, the communication component can retrieve the content from a store utilizing the tag and afford it to the user. Subsequently, the user can remove encryption to reveal the communicated content. These and other aspects of the disclosure preserve privacy such that no one other than the communicating parties can know the source, the recipient, and the content of a communication. Furthermore, collusion can be resisted by not allowing sharing of download privilege without sharing of secret keys and/or other information.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods pertaining to privacy preserving communication are described in further detail hereinafter. Individuals can communicate securely and anonymously such that only designated parties can know the sender, receiver, and content. Mechanisms are provided for anonymously proving membership to a communication system. Moreover, tags can be applied to content in a manner that enables anonymous identification of a recipient and retrieval thereof. Furthermore, mechanisms can deter sharing communication privileges and protect confidentiality of a social network of users, that is parties with whom a user wants to establish communication.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
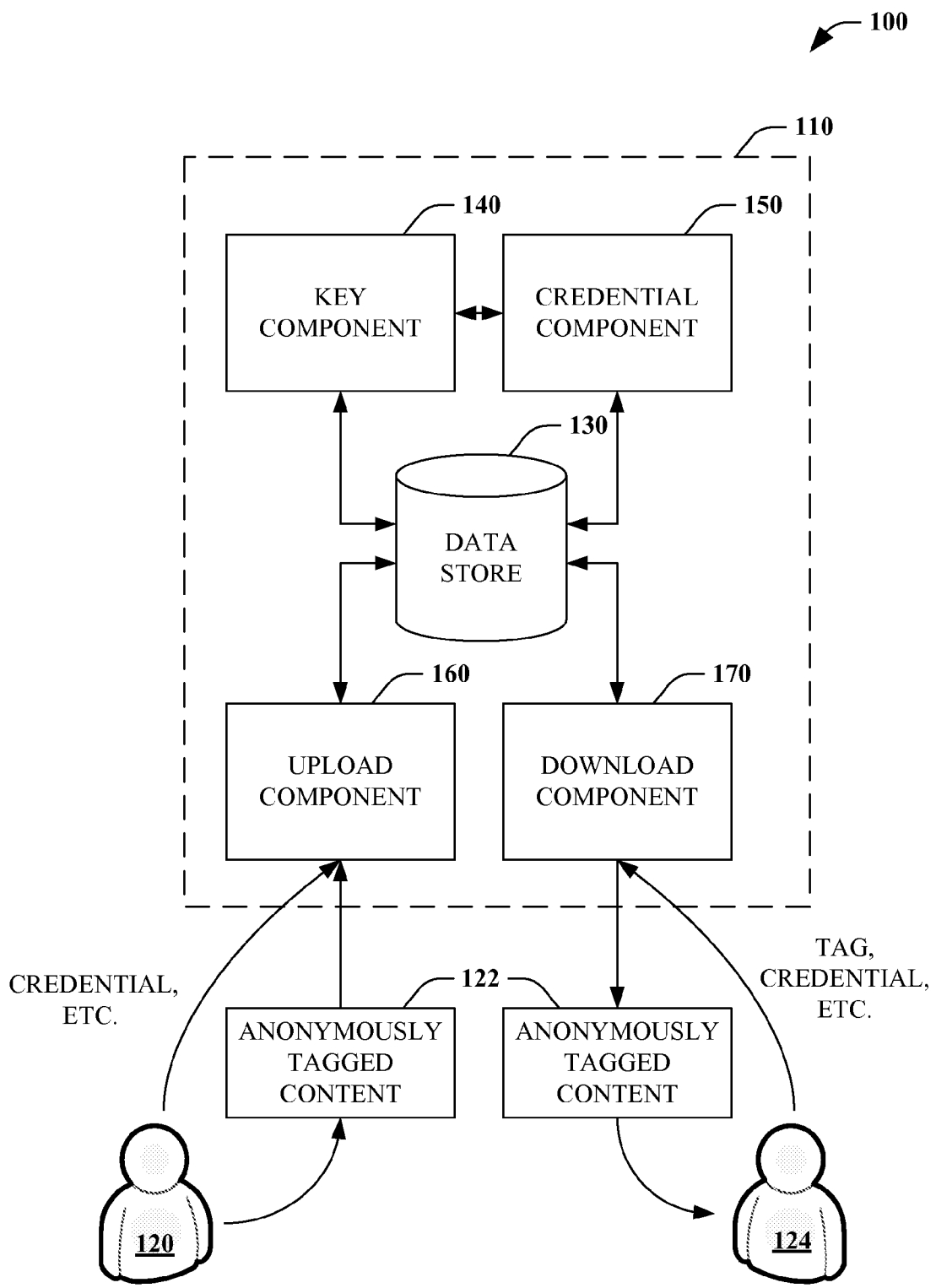
FIG. 1 is a block diagram of a privacy-preserving communication system in accordance with an aspect of the disclosed subject matter.

Referring initially to FIG. 1, a privacy-preserving communication system 100 is illustrated in accordance with an aspect of the claimed subject matter. The system 100 includes an intermediate communication component (or system) 110 with which users 120 and 124 interact to facilitate communication. In accordance with one embodiment, the intermediate communication component 110 can be a server or more particularly a communication server that interacts with communicating user client machines. More specifically, the component 110 can correspond to an anonymous information/data sharing server.

The component 110 includes a data store component 130 for storing or persisting communication content uploaded or otherwise provided by a sender 120 and subsequently downloaded or otherwise acquired by a receiver 124. Accordingly, the data store 130 can correspond to a computer-readable medium or the like associated with a server, for instance. As will be appreciated in light of further description infra, the data store 130 can house content such as messages and/or files for communication including anonymous tags that specify intended recipients without specifically identifying them. Further, the content can be encrypted.

Key component 140 and credential component 150 facilitate anonymous interaction with the communication component 110. The key component 140 can generate keys utilized with respect to encryption, among other things. In particular, the key component 140 can produce a public and private key pair that can be utilized by the communication component 110 to facilitate credential issuance. Of course, such key pairs can be acquired from an external service or system with or without aid from the key component 140.

Additionally or alternatively, the key component 140 can produce a public and private key pair that can be used to facilitate encryption and decryption of data. In one embodiment, such a key pair can be provided to users to enable data encryption and decryption. However, utilizing the communication component 110 to afford keys to users could compromise anonymity since user secret keys are known. To preclude such a possibility, users can obtain public and private key pairs from a third party. Furthermore, such a key pair can be utilized to add another layer of encryption to data stored by the communication component 110. For example, a user can employ a public key associated with the communication component 110 (not a user) to encrypt data.

The credential component 150 is a mechanism that produces anonymous credentials for the communication component 110 or system 100 to enable anonymous yet authorized interaction therewith. Various known or novel credential schemes can be implemented by the credential component 150. As will be described in further detail later, the credential component 150 can employ a user's secret key, perhaps afforded by key component 140, to issue a credential with respect to a user pseudonym.

Upload component 160 facilitates uploading or otherwise supplying content for communication to the data store 130. In particular, the upload component 160 can perform some verification with respect to credentials associated with a user 120, among other things. If validated, the upload component 160 accepts anonymously tagged content 122 from a user or sender 120 and supplies the content 122 to the data store 130.

Download component 170 is the dual of upload component 160. Similarly, the download component 170 accepts a plurality of information from a user or receiver 124 seeking to acquire content to ensure that the content is provided only to intended recipients. For example, the download component 170 can accept a credential to verify that the user is authorized to interact with the communication component 110. Furthermore, the component 170 can accept a tag from the receiver 124 associated with content sought to be received as well as proof that the receiver 124 is linked to the tag. Once appropriate information has been provided the download component can retrieve the anonymously tagged content 122 and provide it to the receiver 124 or associated device.

Figure 2:
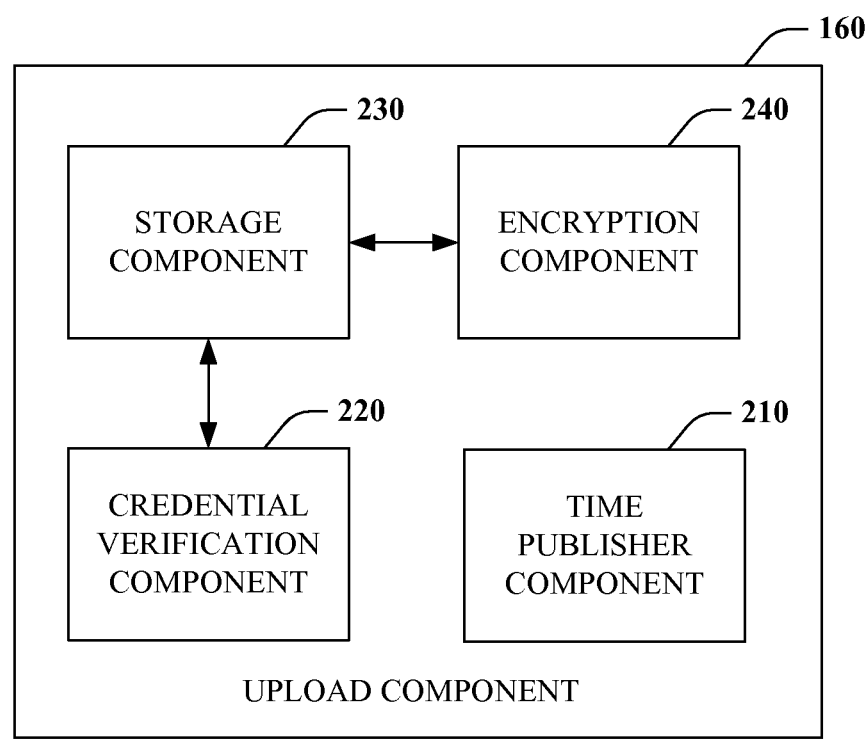
FIG. 2 is a block diagram of a representative upload component in accordance with a disclosed aspect.

FIG. 2 illustrates a representative upload component 160 in further detail according to a disclosed aspect. As shown, the upload component 160 includes a time publish component 210 that continually communicates a current time associated the communication component 110 of FIG. 1. Among other things, this time can be employed with respect to tag generation as will be described further below. Additionally, the upload component 160 includes a credential verification component 220 to control access. In particular, the credential verification component 220 accepts proof of knowledge of a valid anonymous credential. If a valid credential is not provided the upload component 160 will bar interaction. Otherwise, storage component 230 can be employed to store any received content including anonymous tags, such as a file or message, to the data store 130. Further yet, encryption component 240 can be employed to encrypt uploaded content prior to storage to further conceal the content. For example, a public key associated with a communication component 110 can be employed to encrypt the content to provide an additional layer of protection to stored data.

Figure 3:
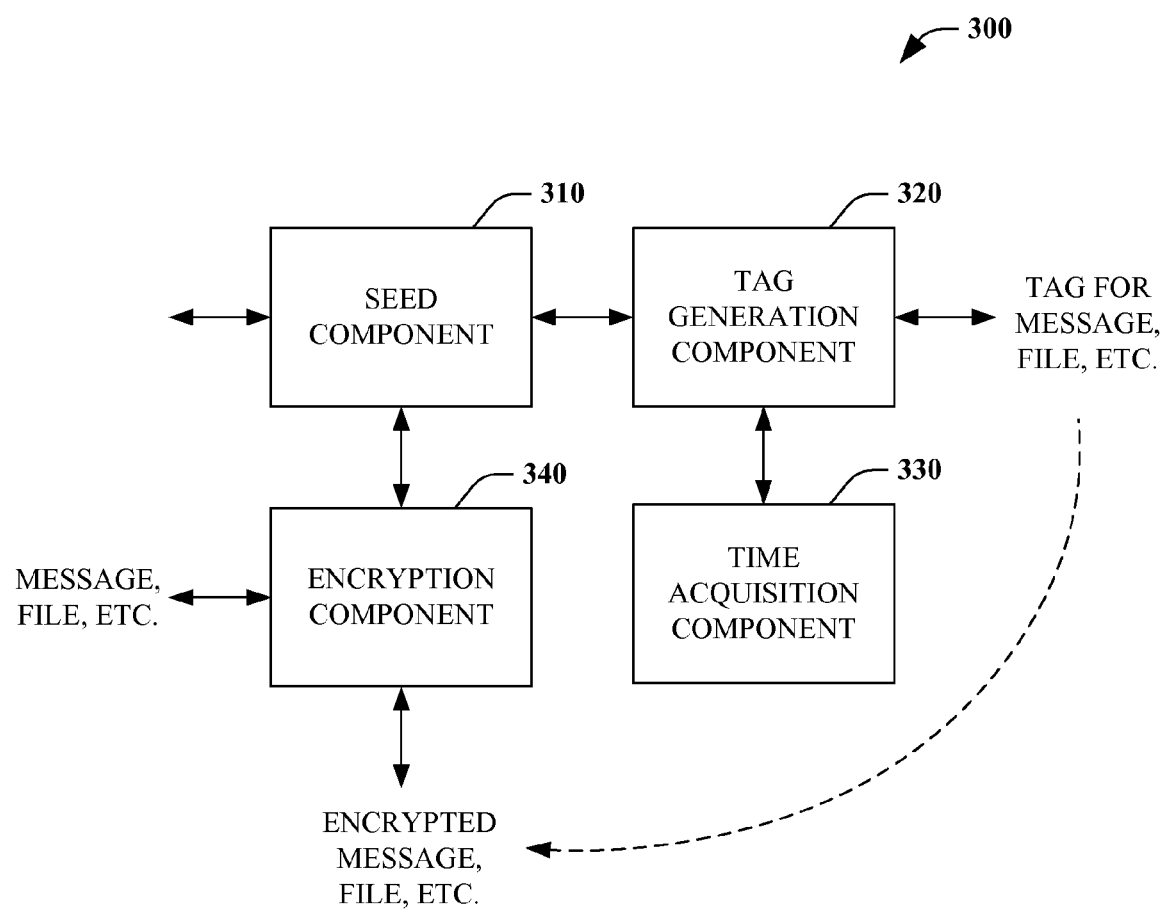
FIG. 3 is a block diagram of a content preparation system according to an aspect of the disclosure.

Turning attention to FIG. 3, a content preparation system 300 is illustrated for interacting with respect to a privacy preserving system in accordance with an aspect of the claimed subject matter. Although not limited thereto, system 300 can be employed by a sender, sender computer, or the like prior to attempting to upload the content. The system 300 includes seed component 310, tag generation component 320, time acquisition component 330, and encryption component 340. In the end, the system 110 can produce encrypted and tagged content for communication. This content can be accepted by the upload component 160 described with respect to FIGS. 1 and 2, according to one aspect.

The seed component 310 produces a seed for use in tag generation, among other things. In particular, the seed can be produced by way of a key agreement between a sender and receiver. In one specific embodiment, the key agreement can correspond to a non-interactive key agreement such that the sender and receiver need not communicate directly to determine the seed. For example, the seed can be generated as a function of public keys where at least one corresponding secret key is known. The seed thus represents a unique value known or able to be computed by both a sender and receiver. Accordingly, the seed component 310 can at least facilitate production of unique seeds for each sender and receiver pair.

The tag generation component 320 constructs anonymous tags for content to be delivered to particular recipients. According to one aspect, generation can be dependent upon input from the seed component 310 and time acquisition component 330, among other things. As previously described, the seed component 310 produces a unique seed for each sender-receiver pair. The time acquisition component 330 acquires or otherwise obtains a time associated with a communication system or component In one instance, the system or component can publish this time such that the time acquisition component 330 need only listen or obtain the time in this manner. Of course, other techniques may need to be employed depending upon implementation details.

According to one aspect, tags can be generated as a function of an intended recipient's public key or more particularly a commitment to the public key. Rather than simply tagging content with a user's public key, which would not provide much if any anonymity, a commitment or commitment scheme can be employed with respect to the key. In general, commitment schemes allow a commitment to a value while keeping the value hidden and preserving the ability to subsequently reveal the value. To hide the value, randomness is applied thereto. Here, the value corresponds to a recipient's public key and the randomness can be generated by a pseudorandom function based on a seed and a current time. More formally, a tag for content from a sender "i" to a receiver "j" can be defined as follows: "$t^{(i)}_j=\mathrm{Commit}(pk_j, \mathrm{PRF}_{seed_{i,j}}(t))$," where is "$pk_j$" the public key of the receiver and PRF is a pseudorandom function that takes the seed "$seed_{i,j}$" and time "t" as input and outputs randomness for the commitment. Consequently, the tag appears completely random to a communication system, and potential eavesdroppers, among others.

In addition to generating a tag for content, the content can be encrypted using encryption component 340. In particular, the seed provided by seed component 310 can be utilized as input to a key derivation function, the output of which can subsequently be employed to encrypt the content. Formally, "$C^{(i)}_j=\mathrm{Enc}_{KDF(seed_{i,j})}(m)$," where "$C^{(i)}_j$" is ciphertext from a sender "i" to a receiver "j," "KDF" is a key derivation function on a seed value for the sender and receiver, and "m" is a message or content. Accordingly, only the sender and receiver can easily access the content.

Both the generated tag and encrypted content (e.g., message, file . . . ), can be afforded by system 300 to an anonymous communication system or component to enable users to connect anonymously. Note that the content is concealed via encryption and the identity of the recipient is obscured by the tag, thereby aiding in anonymous communication thereof. Of further note, is the fact that one need not know the IP (Internet Protocol) address of the receiver, which is required with respect to conventional techniques such as onion routing.

Figure 4:
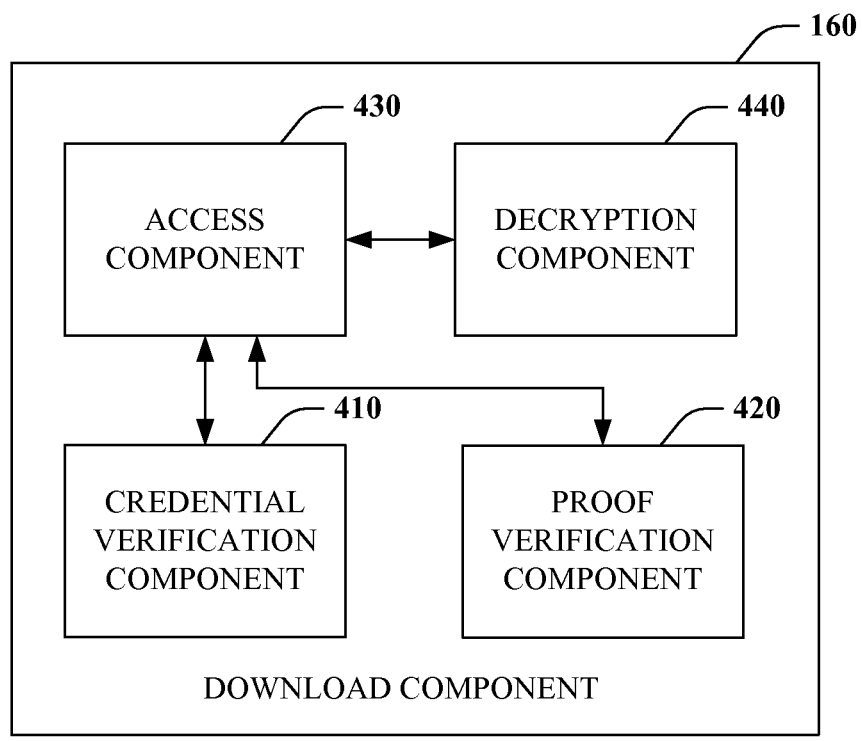
FIG. 4 is a block diagram of a representative download component in accordance with a disclosed aspect.

FIG. 4 depicts a representative download component 170 in accordance with an aspect of the claimed subject matter. As previously described, the download component 170 facilitates provisioning of content intended for system users. In particular, the component 170 includes credential verification component 410, proof verification component 420, access component 430, and decryption component 440.

Both the credential verification component 410 and the proof verification component 420 are mechanisms for controlling access to messages or content. In fact, although illustrated and described separately to distinguish properties of each, a single aggregate verification component can include functionality of both.

The credential verification component 410 can ensure that interactions with the download component 140 are restricted to authorized individuals. To that end, the credential verification component 410 can accept and verify anonymous credentials presented thereto. Interaction can be restricted to those individuals who present credentials that match those provisioned or otherwise accepted.

The proof verification component 420 operates as a control or gatekeeper over content as a function of tags. Computation of a tag and valid credentials need not be the only things required to acquire content. In fact, although difficult, this could compromise content security and/or participant anonymity. To avoid any such issues proof can be required to ensure that a tag is associated with a particular requesting individual. Proof can be afforded to various degrees in numerous ways. For example, proof of one or more of the following can be required, among other things, (1) knowledge of a secret key that corresponds to a public key employed to compute a tag; (2) the credential is related to the secret, public key pair (3) knowledge of values used to compute a tag (e.g., seed, time . . . ); and/or (4) knowledge that the tag is a commitment to the public key of the intended recipient. The proof verification component 420 ensures that a desired level, type, kind, etc. of proof has been provided by a user. By way of example and not limitation, a user can employ a zero-knowledge proof to prove that a public key exists and that the user knows the corresponding secret key.

The access component 430 facilitates access or acquisition of content by anonymous tag from a data store or the like and returns the content to a requesting user. Of course, access and return can be dependent upon successful verification, validation, or the like with respect to components 410 and 420. In other words, unless a valid credential and appropriate proof are provided the download component 140 need not return the requested content. In fact, several unsuccessful attempts at validation and/or proof can have consequence such as locking out of a particular individual and/or investigation, among other things. Furthermore, it should be appreciated that in addition to any encryption associated with content provided by users a communicating system can also provide encryption. Where such system encryption is provided, decryption component 440 can be employed to remove the applied encryption utilizing known technology prior to returning the content.

Figure 5:
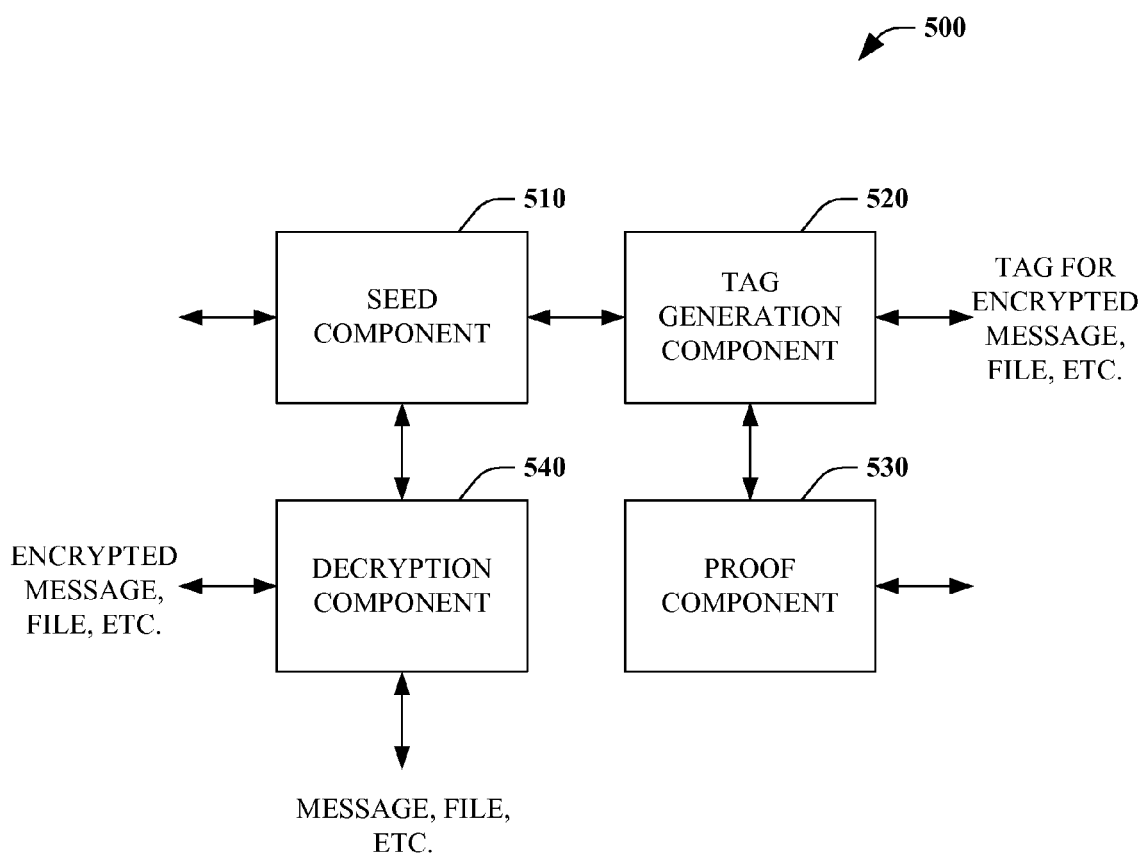
FIG. 5 is a block diagram of a content acquisition system according to an aspect of the disclosure.

FIG. 5 illustrates a content acquisition system 500 in accordance with an aspect of the claimed subject matter. Although not limited thereto, the system 500 can implemented with respect to a receiver and/or associated machine. In particular, several actions can be performed to effect acquisition of content, which are implemented with respect to seed component 510, tag generation component 520, proof component 530, and decryption component 540.

The seed component 510 computes, determines, or otherwise discovers a seed utilized by a sender to afford communication to a receiver. In accordance with one aspect, this can be determined as a function of a key agreement between a sender and a receiver. In one particular embodiment, a non-interactive key agreement can be employed. In other words, the seed or shared secret can be computed by either party without interaction. For example, the seed can be computed as a function of the receiver's secret key and the sender's public key.

The tag generation component 520 can employ the seed provided by the seed component 510, among other things to produce a tag identifying content intended for a user. More specifically, the tag can be computed as a commitment to a recipient's public key with randomness generated by a pseudorandom function based on the shared seed and a particular time period, where the time period varies by implementation but can refer to day, hour, second, etc. Accordingly, the tags can differ for content communicated at different time periods. Once a tag is produced, it can be provided to a communication system or component to identify desired content.

The proof component 530 affords proof to a communication system or component that a user is linked to the provided tag. For example, this can involve identifying some randomness associated with generation of the tag, among other things. Further, the proof component 530 can prove with zero knowledge that the public key utilized to compute the tag is associated with a secret key known by the requesting entity. Still further yet, the proof component 530 can prove that both the public key employed to produce the tag and corresponding secret key are related to a provisioned or otherwise acceptable credential. The type, kind, and scope of proof can depend on a particular implementation and/or an acceptable threshold. Accordingly, the proof component 530 can implement various functionalities dependent upon the type, kind, etc. of proof demanded by a communication system or component.

After a tag and appropriate proof are provided, content can be received or retrieved from a communication system in an encrypted form. The decryption component 540 provides functionality to decrypt or otherwise remove encryption applied to the content. In accordance with one aspect, encryption and corresponding decryption can be based on the value of the seed. For example, a key derivation function can take the seed as input and output a key that can be employed to decrypt the content. More formally, a user can recover "K=KDF($seed_{i,j}$)," where "K" is a key, "KDF" is a key derivation function, and "$seed_{i,j}$" is a seed shared by a sender and receiver. The content can then be decrypted by "$Dec_K(C^{(i)}_j)$," where "K" is the key and "$C^{(i)}_j$" is the ciphertext corresponding to sent content. The decryption component 540 thus produces as output the original unencrypted message, file or other content.

Although not shown, it is to be appreciated that content preparation system 300 and content acquisition component 500 can include a key component similar to key component 140 of FIG. 1. The key component can aid users in acquiring public-private key pairs, for example from a third party service or provider. By way of example and not limitation, the key component can direct a user to such a third party and facilitate obtaining and managing keys. Once acquired, the keys can be employed with respect to acquiring credentials as well as uploading and downloading data.

Figure 6:
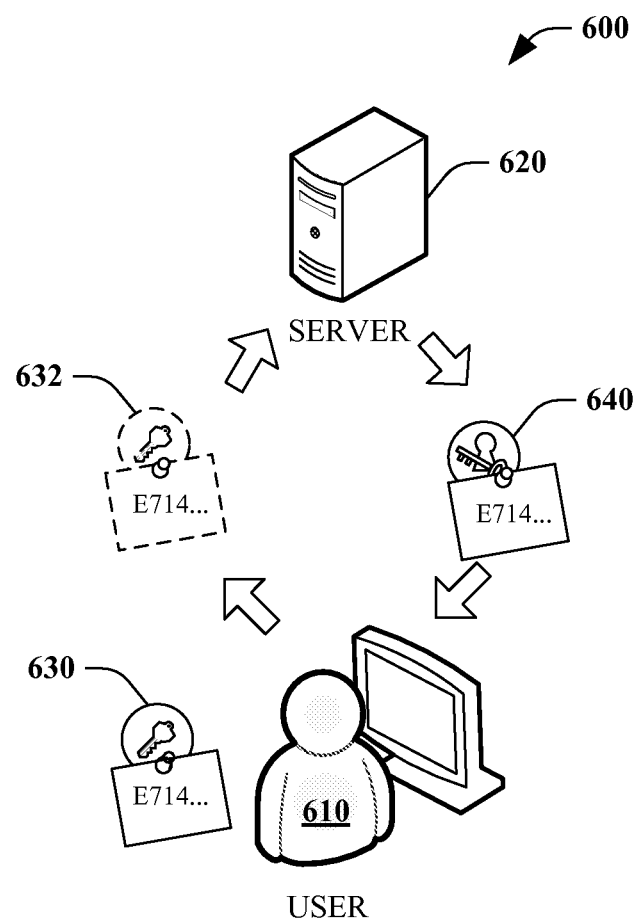
FIG. 6 illustrates operation of a registration system in accordance with an aspect of the disclosure.
Figure 7:
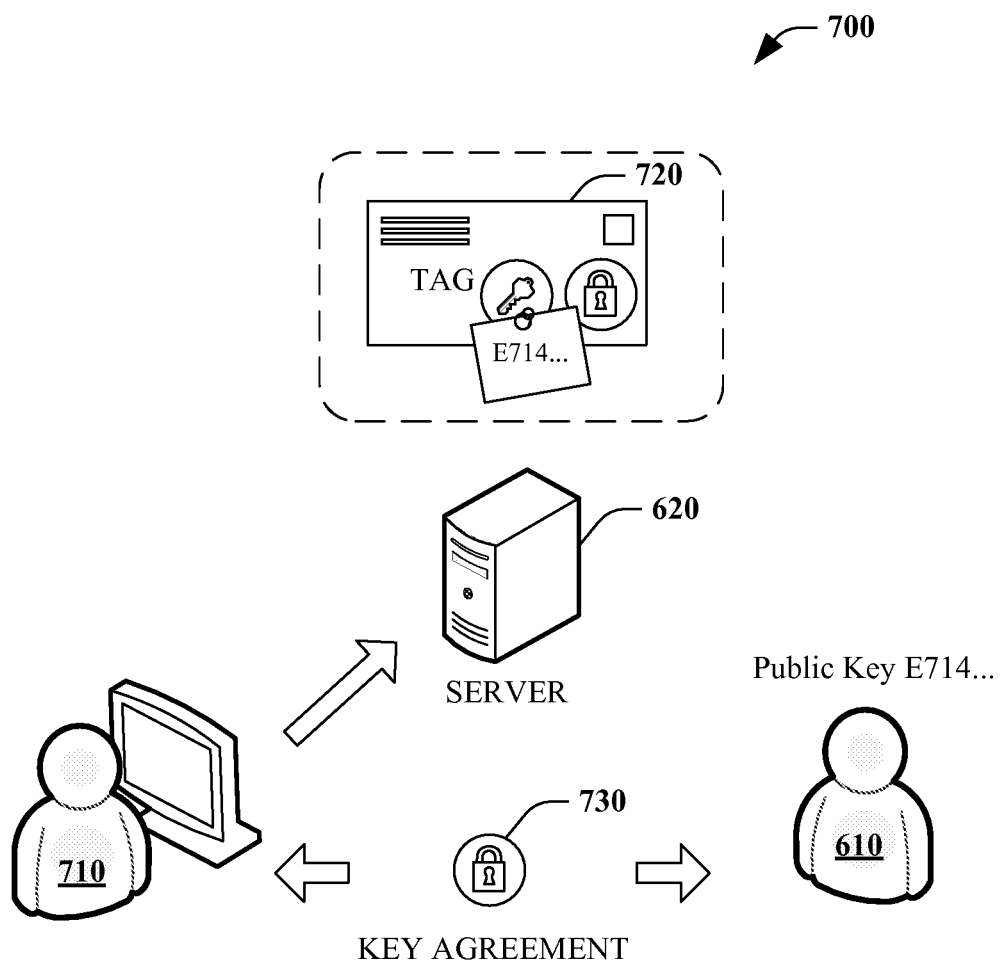
FIG. 7 illustrates a system for uploading content according to a disclosed aspect.
Figure 8:
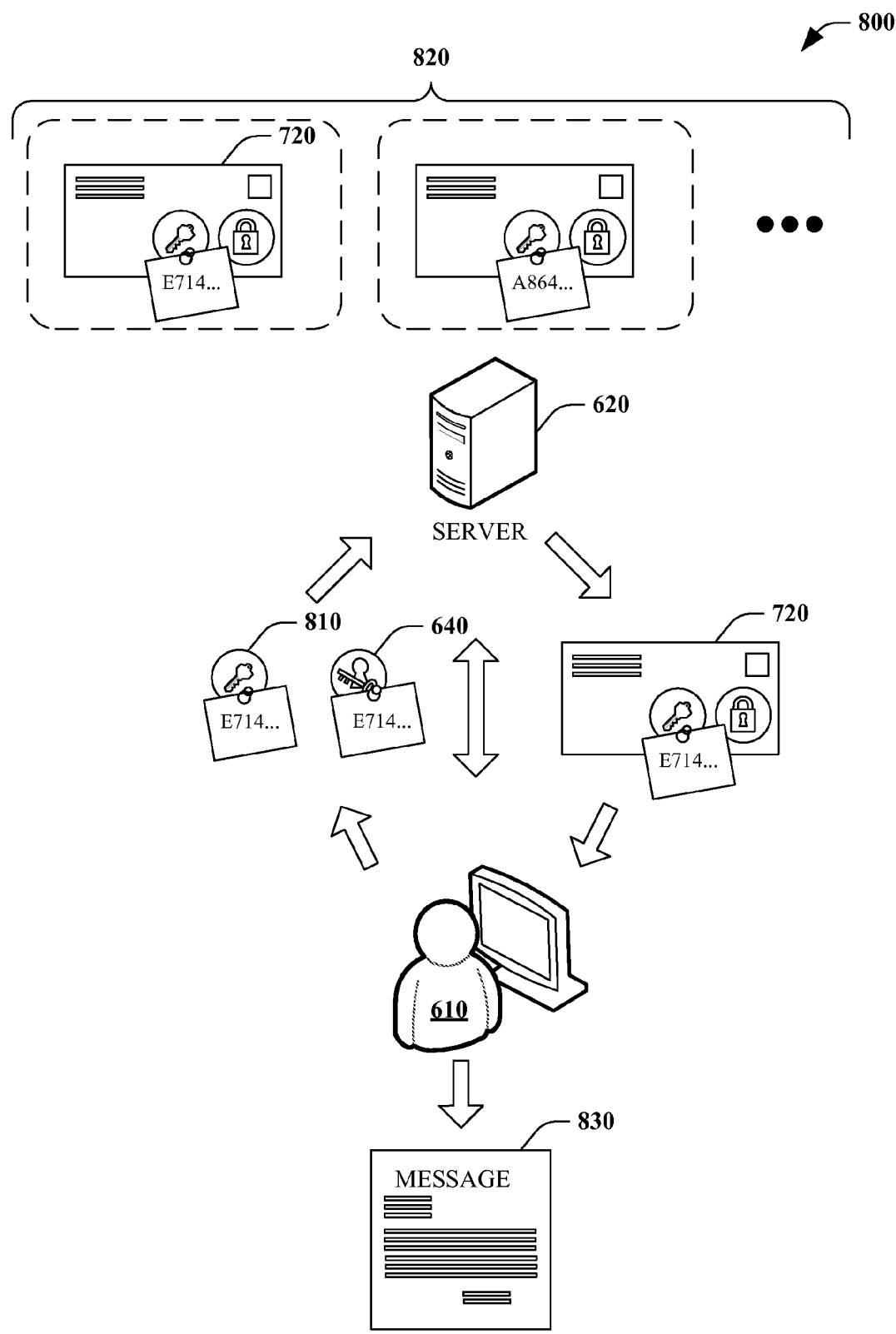
FIG. 8 illustrates a system for downloading content in accordance with an aspect of the disclosure.

FIGS. 6-8 illustrate aspects of the disclosure in a more concrete and graphical format to aid clarity and understanding. Of course, these figures and related description are intended solely for that purpose and not to limit the scope of the claims. Furthermore, various other concrete examples and graphical illustrations are also possible, but are not presented for purposes of brevity.

FIG. 6 illustrates a user registration system 600 in accordance with an aspect of the claimed subject matter. As shown, a user 610 wishes to register with a communication server 620. The user has a secret key 630 of a secret-public or private-public key pair of a particular value. The user can then present this private key 630 in a blinded form 632 to the server 620. For example, the user 610 can select a random value "r" and compute "(comm, dec)=Commit($sk_u$, r)," where "$sk_u$" is the user's secret key, "comm" is a commitment value that acts as a pseudonym and "dec" is the decommitment value for opening the commitment. The user 610 can then prove that he/she has committed to the secret key that corresponds to the public key "$pk_u$" using a zero-knowledge proof, among other things, for instance. The user can then run the function "ObtainKey($sk_u$, comm, dec)" with the server 620, which can run "IssueKey(sk, comm)" using an anonymous credential scheme. In other words, the server 620 can return an anonymous credential to the user 610. Now the user is registered and able to communicate via the server 620 even though the server does not know the exact identity of the user 610 but rather an anonymous pseudonym, for instance.

FIG. 7 depicts a system 700 for uploading or affording content to the communication server to facilitate peer-to-peer communication, for instance. Here, user 710 wishes to upload a message for user 610. After the user 710 validates himself/herself with the server 620 by way of presentation of an associated anonymous credential provisioned thereby at registration, the user 710 generates an encrypted version of the message with an anonymous tag 720 that is provided to and stored by the communication server 620. Both encryption and tagging can be a function of a seed or shared information between user 710 and user 610. The seed can be acquired utilizing a key agreement 730. While not limited thereto, in accordance with one embodiment, a non-interactive key agreement can be utilized. For example, the seed can be generated as a function of knowledge of both user's public key and one corresponding secret key.

The tag can be generated as a commitment to the intended recipient's public key. The public key can be obtained from the user offline or the server 620 can publish a list of public keys and names associated users, among other things. Note that after a registration phase, the server 620 need not be provided with or know the public key. Randomness associated with the commitment can be generated as a function of the seed and current time afforded by the communication server 620.

Although not limited thereto, encryption can also be dependent upon the seed. More specifically, a key derivation function can be employed to produce an encryption key. This key can then be utilized to encrypt the message afforded to the server by the user 710. In this manner, even the encrypted version of the message appears anonymous to any prying eyes including the server 620.

FIG. 8 illustrates a system 800 for downloading or otherwise acquiring messages in accordance with an aspect. Here, the target of a message from user 710 of FIG. 7, namely user 610, is illustrated. To acquire the sent message, user 610 transmits a plurality of information to the server 620. In particular, the user 610 provides credential 640 to the server specifying that user 610 is authorized to interact with the server 620. Further, the user 610 provides a tag 810 associated with the message it wants to retrieve.

Although not illustrated in detail, it is also to be appreciated that the user 610 may need to prove one or more things to the server 620 such that the server can trust that the tag 810 is linked to the user. For instance, the user 610 may need to prove, among other things, that: (1) the tag 810 was generated using the public key of user 610; (2) the user 610 knows the corresponding private key; and (3) the user 610 has the credential associated with that key pair.

Once the server 620 verifies the provided proof, it can employ the tag 810 to search amongst a plurality of stored messages 820 to locate the encrypted message 720 previously sent and transmit it back to the user 610. At this point, the user 610 can utilize a shared seed to generate a key that can then be employed to remove the encryption and reveal the message 830 sent thereto.

It is to be appreciated that various disclosed aspects above as well as below can be utilized with respect to various communication systems. By way of example and not limitation, aspects can be utilized with respect to file transfer or exchange. For instance, a user can employ a privacy-preserving communication system to transfer particular files. Additionally or alternatively, aspects can be employed in an instant messaging communication system or the like. In fact, in such an embodiment support is provided for communicating or dropping off a message or other content for offline users.

In any event, it is also to be noted that with respect to the disclosed system above and below methods, it is not necessary to know a sender and/or receiver address (e.g., IP address) as is often required by conventional systems (e.g., onion routing). Accordingly, people can move around and employ different computers and/or devices.

Nevertheless, to support application of instant messaging an IP address can be encrypted. Considering that a server is powerful enough to store all the tags in a typical scenario, and the tags for time "t" can be deleted by the server at time "t+1" even when a user does not explicitly logout from the system, the size of the tag sets can grow linearly with the number of friends. Further, since the tag can be deterministically determined by a seed, public key, and time index, efficient lookup can be done by the server instead of a linear search over the tags of all users.

One issue with this approach is that the number of friends each person is leaked to the server. Yet, a straightforward solution is to include dummy tags such that only the lower bound on the number of friends is leaked. This employs a little extra temporary storage on the server side without increasing the complexities of any other part of the protocols.

Using an anonymous instant messenger also means there is no directory for one to look up whether his/her friend has already enrolled in the system. Hence, it seems the initial friendship can be established by other off-band communications. However, non-interactive key agreements are supported to establish the initial secret seed between two users as long as one can get the public key of another party. In this way, the system supports pre-approval of friendships.

It is to be noted that part of the responsibilities of a server is to store ciphertext and the corresponding tags or encrypted indices. Accordingly, this role can be embodied by a passive "bulletin board" since all entries are encrypted anyway. However, one reason to employ a server or other active technology over a bulletin board is to avoid an attack where a user can delegate download privilege of his/her friend "i" to someone else who is potentially not a friend of "i." Suppose ciphertexts are posted on a bulletin board, "j" can just transfer "$seed_{i,j}$" to an adversary, which can get "i's" message without further help from "j." However, a bulletin board or distributed table can offer the advantage of distributed storage, which can avoid denial-of-service (DoS) attack where a malicious server withholds the ciphertext of some random user. With the unlinkability of the protocol employed by the disclosed system, such a DoS attach cannot be launched against a specific user.

Another variation is to keep tags in secure storage while making ciphertext available. Without tags, a malicious user can just try decrypting all ciphertexts using the obtained seed.

As per disclosed aspects, however, one can at least discourage sharing of privileges or collusion. In particular, sharing of download privileges utilizing a seed can be discouraged or prevented by also requiring (e.g., via an active server) sharing of their secret keys, credentials, etc., which would allow access to other download and upload privileges, among other things. Since a user is unlikely to release such secret information, such collusion is equally improbable.

The aforementioned systems, architectures, and the like have been described with respect to interaction between several components. It should be appreciated that such systems and components can include those components or subcomponents specified therein, some of the specified components or sub-components, and/or additional components. Sub-components could also be implemented as components communicatively coupled to other components rather than included within parent components. Further yet, one or more components and/or subcomponents may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

By way of example and not limitation, such mechanisms can be employed to determine or infer system tampering that threatens anonymity, among other things, and implement or propose corrective action. For instance, download component 170 of FIG. 1 can detect a number of attempted message downloads that fail multiple times for not providing proper proof and infer that tampering may be occurring and action(s) to address the tampering.

In view of the exemplary systems described supra, methodologies that may be implemented in accordance with the disclosed subject matter will be better appreciated with reference to the flow charts of FIGS. 9-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 9:
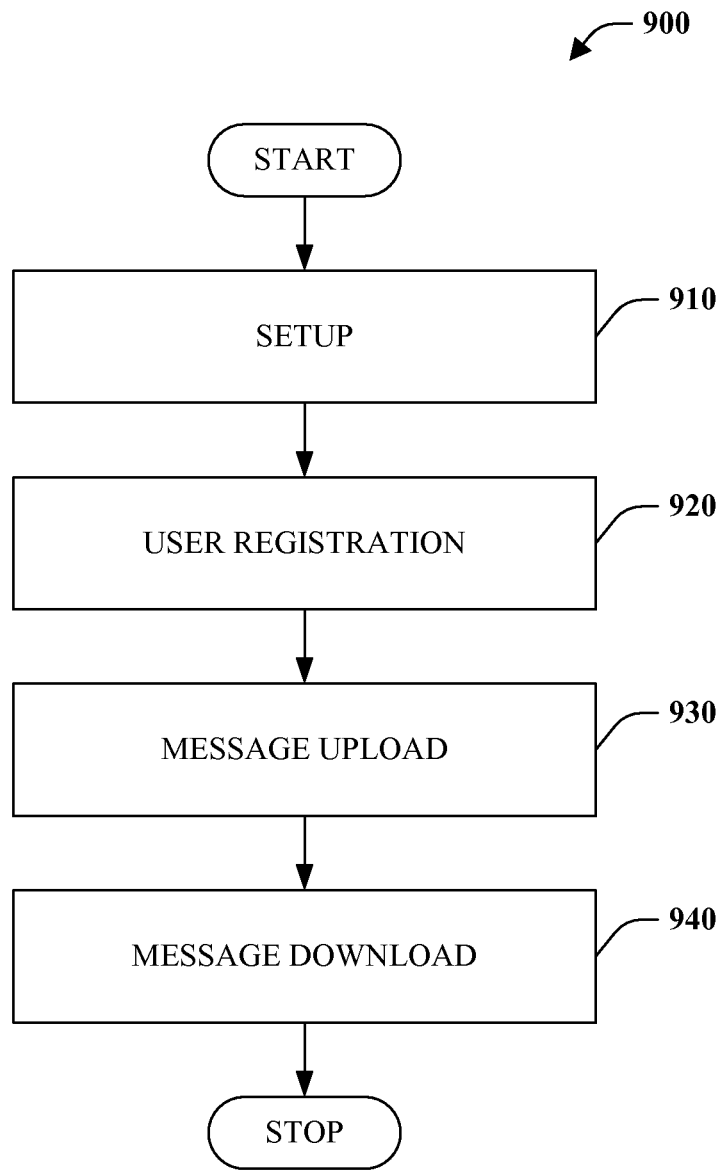
FIG. 9 is a flow chart diagram of a method of or protocol for communicating in accordance with a disclosed aspect.

Referring to FIG. 9, a method or protocol of communication 900 is illustrated in accordance with an aspect of the claimed subject matter. At reference numeral 910, setup can be performed. For example, communication system can generate a server secret key "sk" and global parameters "Pub" (which includes the corresponding public key) as a function of a security parameter. Here, the server secret key can be used for issuing credentials to users, among other things. Other actions can take "Pub" implicitly as an input. At numeral 920, users are registered. Among other things, registration can include provisioning of a secret key in a blinded form and acquiring an anonymous credential associated with a pseudonym, for example. At reference 930, a message or content is uploaded. In particular, the content be encrypted and include an anonymous tag or identifier designating an intended recipient. At reference numeral 940, a message or content is downloaded.

To this end, a tag and various proofs indicative of an association with that tag and authorized system use can be provided. The message or content can then be identified by the tag and presented to a user, which can subsequently remove the decryption associated with the content or in other words decrypt a message to reveal its content.

Figure 10:
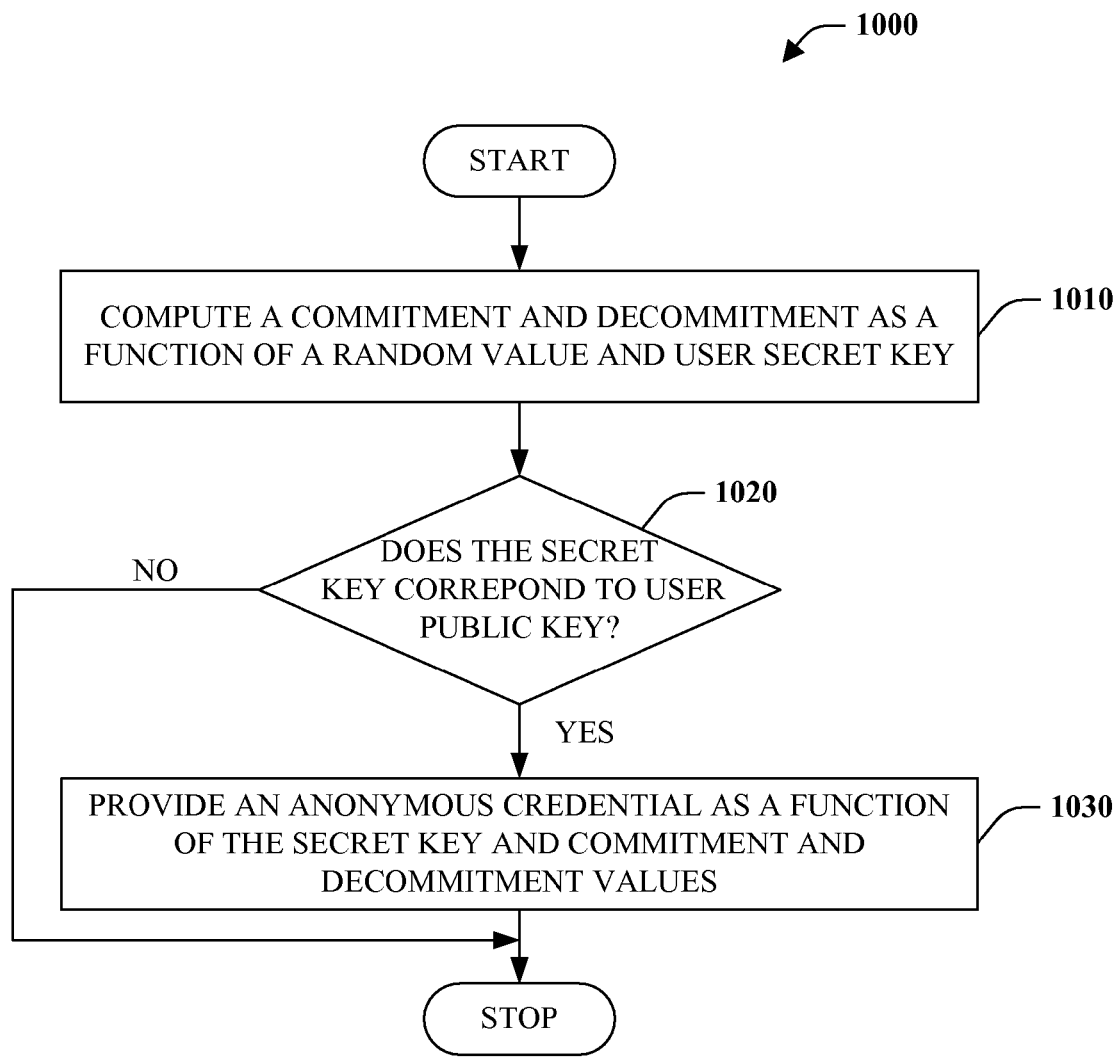
FIG. 10 is a flow chart diagram of a registration method in accordance with an aspect of the disclosure.

FIG. 10 is a method of registration 1000 in accordance with an aspect of the claimed subject matter. At reference numeral 1010, a commitment and decommitment value are computed as a function of a random value and a user secret key. In other words, a commitment to a secret key is computed as well as a decommitment value for opening the commitment. At numeral 1020, a determination is made as to whether the secret key is corresponds to a user's public key. By way of example and not limitation, such a determination can be made with a zero-knowledge proof. If the secret key corresponds to a user's public key ("YES"), the method continues at reference numeral 1030. Otherwise ("NO"), the method simply terminates. At numeral 1030, an anonymous credential is provided as a function of the secret key as well as commitment and decommitment values in accordance with an anonymous credential scheme.

Figure 11:
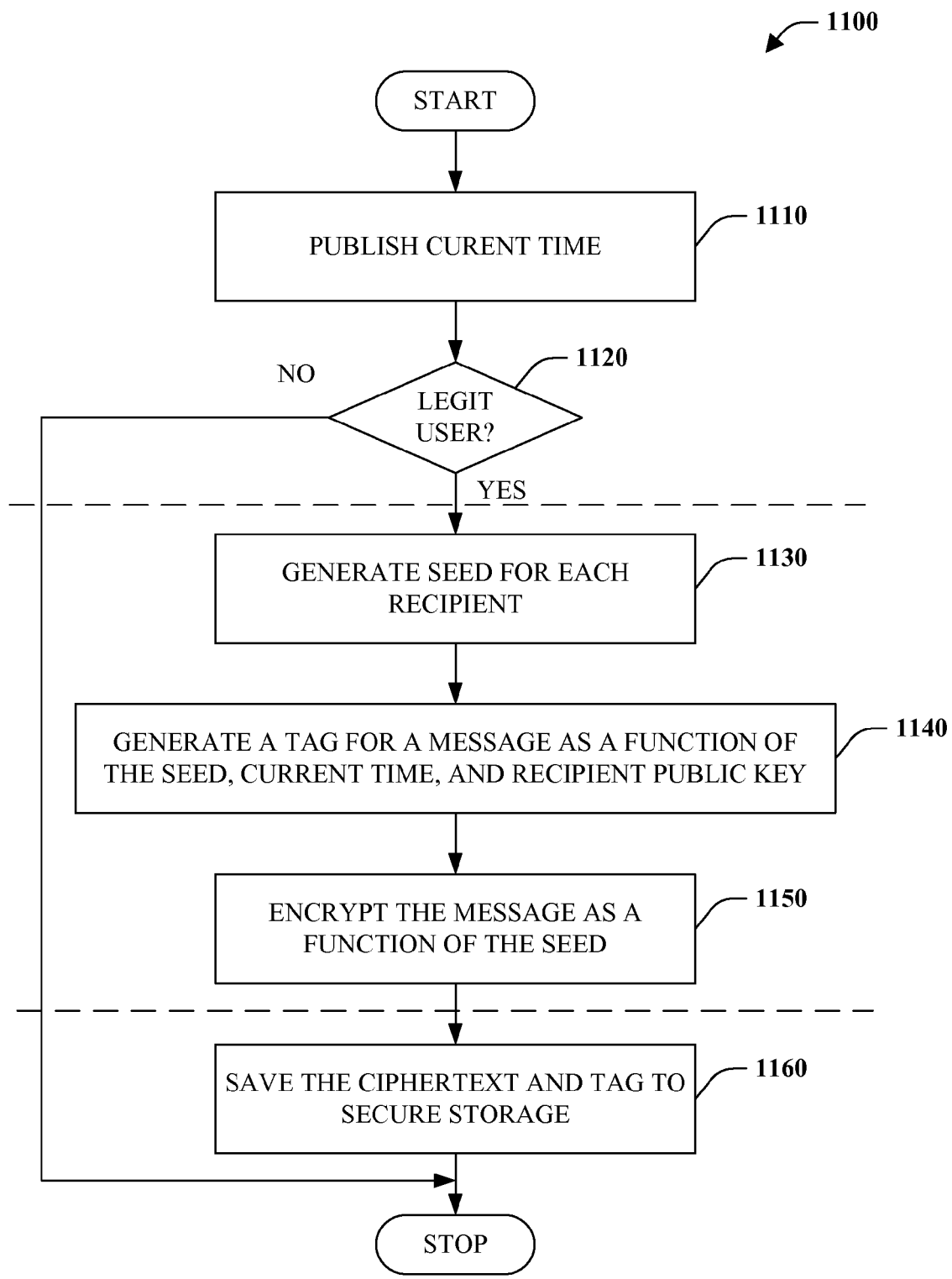
FIG. 11 is a flow chart diagram of a method of uploading communications in accordance with a disclosed aspect.

FIG. 11 illustrates a method of uploading 1100 in accordance with an aspect of the claimed subject matter. At reference numeral 1110, a current time associated with a communication system is published. This time can vary based on implementation details but can be of different granularities such as day, hour, or second, among others. At numeral 1120, a determination is made as to whether a user is legitimate. For example, an anonymous credential can be provided, received, and analyzed to determine if it is acceptable. If no, the method terminates, as the user is not authorized to upload messages, content, or the like. Additionally, the user can be directed to register with the system (not shown). If yes, the method continues at 1130 where a seed is computed or generated for a recipient. Such a seed or uniquely shared information can be a product of a key agreement such as but not limited to a non-interactive key agreement protocol. At numeral 1140, a tag can be generated for a message or content to be sent as a function of a recipient public key, the seed, and the current time. For example, a commitment can be generated to the public key where the randomness is provided by a pseudorandom function that takes the seed and current time as input. At reference 1150, the message or content is encrypted as a function of the seed. For instance, a key derivation function can be executed with respect to the seed to produce a key that can by employed to encrypt the content. At reference numeral 1160, the ciphertext and associated tag are saved to secure storage.

Figure 12:
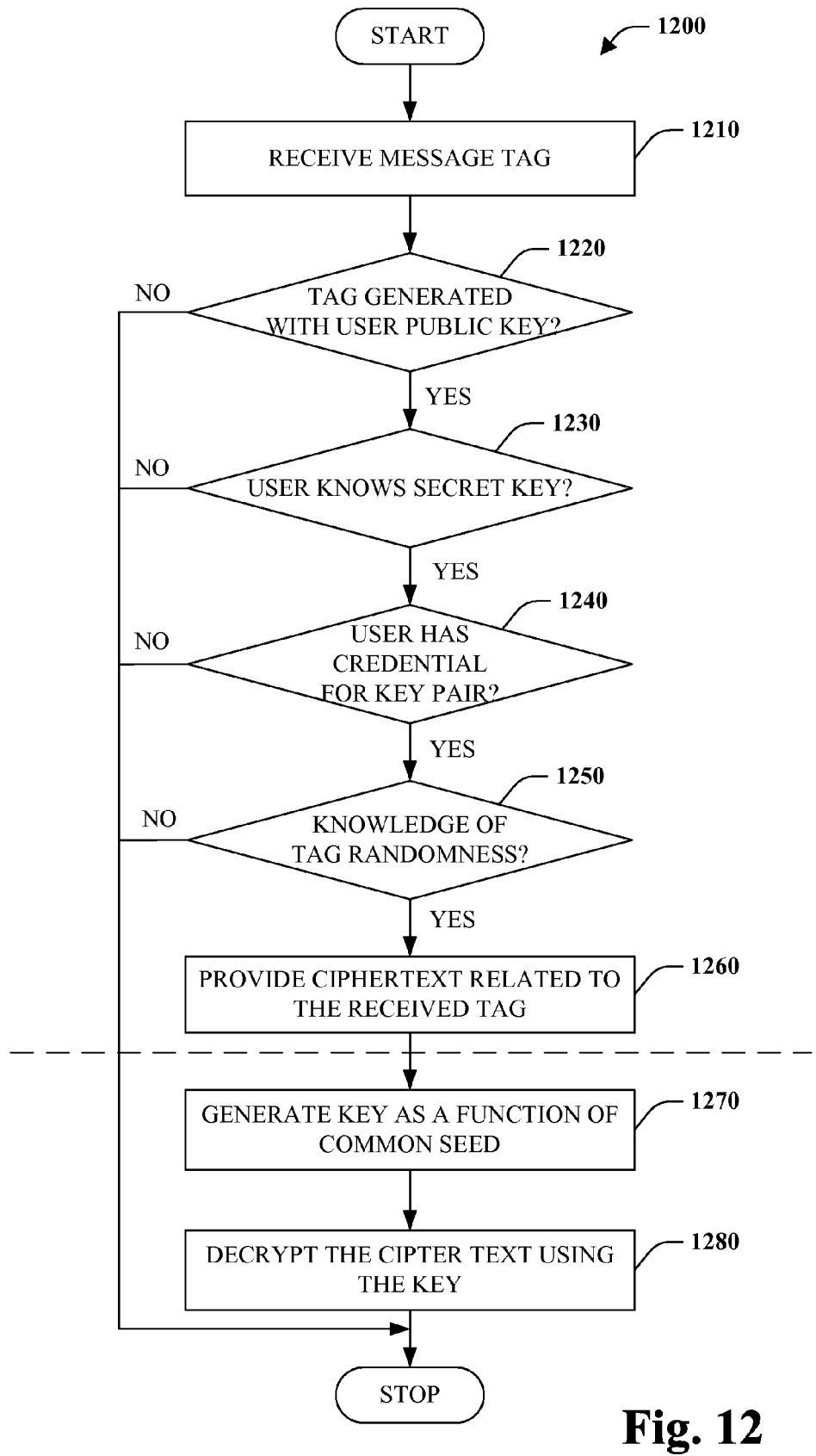
FIG. 12 is a flow chart diagram of a method of downloading communications according to an aspect of the disclosure.

FIG. 12 depicts a method of downloading communications 1200 in accordance with an aspect of the claimed subject matter. At reference numeral 1210, a tag is received with respect to downloading or retrieval of a message or content. At numeral 1220, a determination is made as to whether or not the tag was generated utilizing a requesting user's public key. This can be accomplished utilizing a zero-knowledge proof. If the tag was generated with the user's public key ("YES"), the method proceeds to numeral 1230. Otherwise ("NO"), the method terminates. At reference 1230, a check is made to determine if the user knows the secret key associated with the public key employed in the tag. Again, this can be accomplished via zero-knowledge proofs, among other things, to protect anonymity. If the user knows the secret key associated with the public key ("YES"), the method continues at 1240. Else ("NO"), the method terminates. At 1240, a determination is made as to whether the public and secret keys are associated with an anonymous credential held by a user. This can be tested by acquiring a user's anonymous credential and subsequently verifying keys utilized in its generation. If the keys are associated with the credential ("YES"), the method continues at 1250. Otherwise ("NO"), the method terminates. At reference numeral 1250, a check is made to determine whether or not a user knows the randomness employed to compute the tag. A user can compute this if he/she knows the seed employed as well as the time index utilizing a pseudorandom function. If the user does not know the randomness ("NO"), the method terminates. Otherwise, the method continues at 1260, where the ciphertext related to the tag is provided to a requesting party, entity or the like. A key can be generated as a function of the seed associated with a sender and receiver at 1270 and employed to decrypt or remove encryption thereby revealing the plaintext.

It is to be noted that methods 1100 and 1200 include a plurality of actions that can be executed by a single entity or multiple entities. By way of example and not limitation, some actions can be performed by a server while others are executed by a client with respect to a client-server architecture. The dashed lines on the diagrams indicate potential division of functionality with respect to a client or a server. Of course, the claimed subject matter is not limited thereto.

What follows is a brief discussion of a few concepts or building blocks that are utilized with respect to aspects of the claimed subject matter. It is to be appreciated that such discussion is not intended to limit the scope of the subject claims but rather to provide further clarity and understanding. In particular, aspects of the disclosure employ a pseudorandom function, commitment scheme, key derivation function, and symmetric encryption.

A pseudorandom function (PRF) can be defined by a tuple "$(G_p, p, g, s)$" where "$G_p = \langle g \rangle$" is a cyclic group of prime order "p" and "s" is an element in "Zp." On input "x," "$PRF_{g,s}(x)$" is defined as $$\text{"}PRF_{g,s}(x): x \rightarrow \frac{1}{g^{s+x}}.\text{"}$$

Efficient proof such that the output is correctly formed (with respect to "s" and "x" in some commitment scheme such as Pederson Commitment) exists and the output of $PRF_{g,x}$ is indistinguishable from random elements in $G_p$, provided that the k-DDHI (Decisional Diffie-Hellman Inversion) assumption holds. This is true if the domain of the function is of size "k," and the two are indistinguishable to an entity whose computational power is polynomial time.

A commitment scheme can be a pair of PPT (Probabilistic Polynomial Time) algorithms "(Commit, Rec)" such that "Commit" takes as input a message "m" and auxiliary information "r∈{0, 1}*"; returns "(com, dec)" ∈U×V" representing the commitment and the decommitment string respectively.

"Rec" takes "($1^l$, com, dec)" and returns "m∈{0,1}*∪{⊥}." Both "Commit" and "Rec" can take the security parameter "$1^l$" implicitly.

Correctness requires "Rec($1^l$, Commit(m, r))=m, ∀m, r ∈ {0, 1}*." For security, binding and hiding properties are considered. Hiding means that "com" should not reveal information about "m;" binding means an adversarially generated "com" can be "opened" to only a single legal value of "m." Formal definitions are as follows:

Hiding: "∀$m_1$, $m_2$∈{0, 1}*, $\|C_l(m_1)-C_l(m_2)\|=O(2^{-l})$," where "$C_l(m)$" denotes the distribution over the commitment strings for "m." That is, the first component of "Commit(m, r)"'s output.

Binding: For all PPT adversaries "A," the following probability is negligible:

$$Pr\begin{bmatrix}(com, dec, dec') \leftarrow A(1^l):\\(Rec(com, dec) \neq \perp) \wedge\\(Rec(com, dec') \neq \perp) \wedge\\(Rec(com, dec) \neq Rec(com, dec))\end{bmatrix}.$$

Turning attention to a key derivation function, "K: {0, 1}*→{0, 1}n" is a key derivation function if the output of "K" is computationally indistinguishable from a random distribution when the input comes from a uniform distribution.

Aspects of the disclosure rely on a stateless symmetric key encryption scheme, which is defined by a triple of PPT (Probabilistic Polynomial Time) algorithm "(Gen, Enc, Dec):"

"Gen" takes security parameter "$1^l$;" outputs a secret key "sk∈$K_l$," the descriptions of a message space "$M_l$" and the secret key space $K_l$."

"Enc" (probabilistic) takes "sk" and a message "m," and outpus a ciphertext "C."

"Dec" (deterministic) takes "sk" and "C," and outputs a message "m" or "⊥" if "C" is invalid.

For correctness, "$DEC_{sk}(Enc_{sk}(m))=m$" for all "l∈M," all "sk∈$K_l$," generated by "Gen($1^l$)," and for all messages "m∈$M_l$." For security, indistinguishability can be required against adaptive chosen-plaintext attack (CPA). Formally speaking, the following is negligible for all PPT "A=($A_1$, $A_2$):"

$$\left| Pr\begin{bmatrix}(sk, M_l, K_l) \leftarrow Gen(1^l);\\(m_0, m_1, \beta) \leftarrow A_1^{Enc_{sk}(\cdot)}(1^l);\\ \tilde{c} \leftarrow Enc_{sk}(m_b);\\ \tilde{b} \leftarrow A_2^{Enc_{sk}(\cdot)}(\tilde{c}, \beta);\end{bmatrix} : b = \tilde{b} - \frac{1}{2}\right|.$$

As used throughout, the terms "anonymous communication," "privacy-preserving communication" or like refer to communication between parties in which the identity of the communicating parties is unknown to anyone or any entity other than the communicating parties. Stated differently, if communication is anonymous or privacy preserving, no other party can learn anything about the identity of the sender and the receiver.

Herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 13:
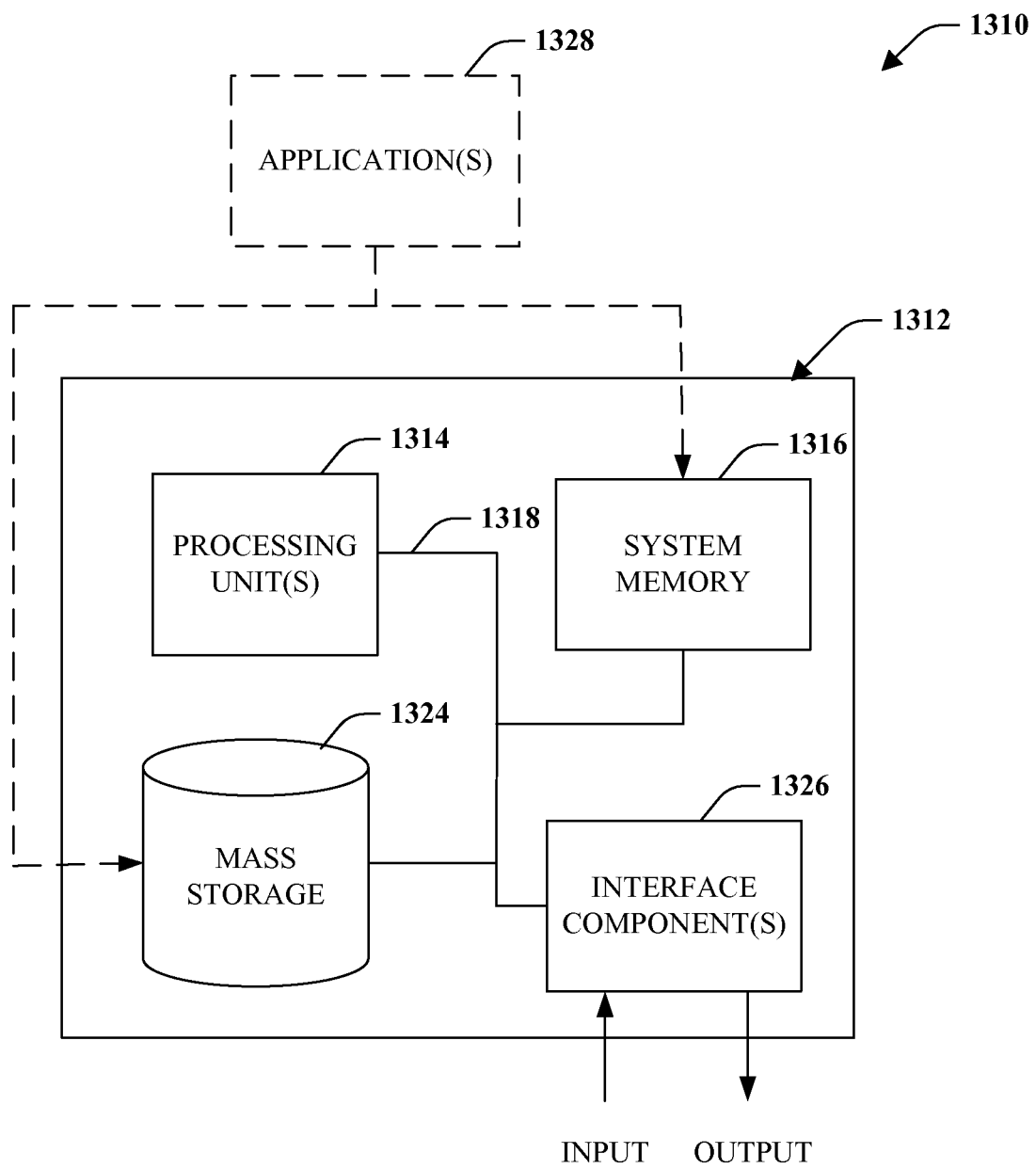
FIG. 13 is a schematic block diagram illustrating a suitable operating environment for aspects of the subject disclosure.
Figure 14:
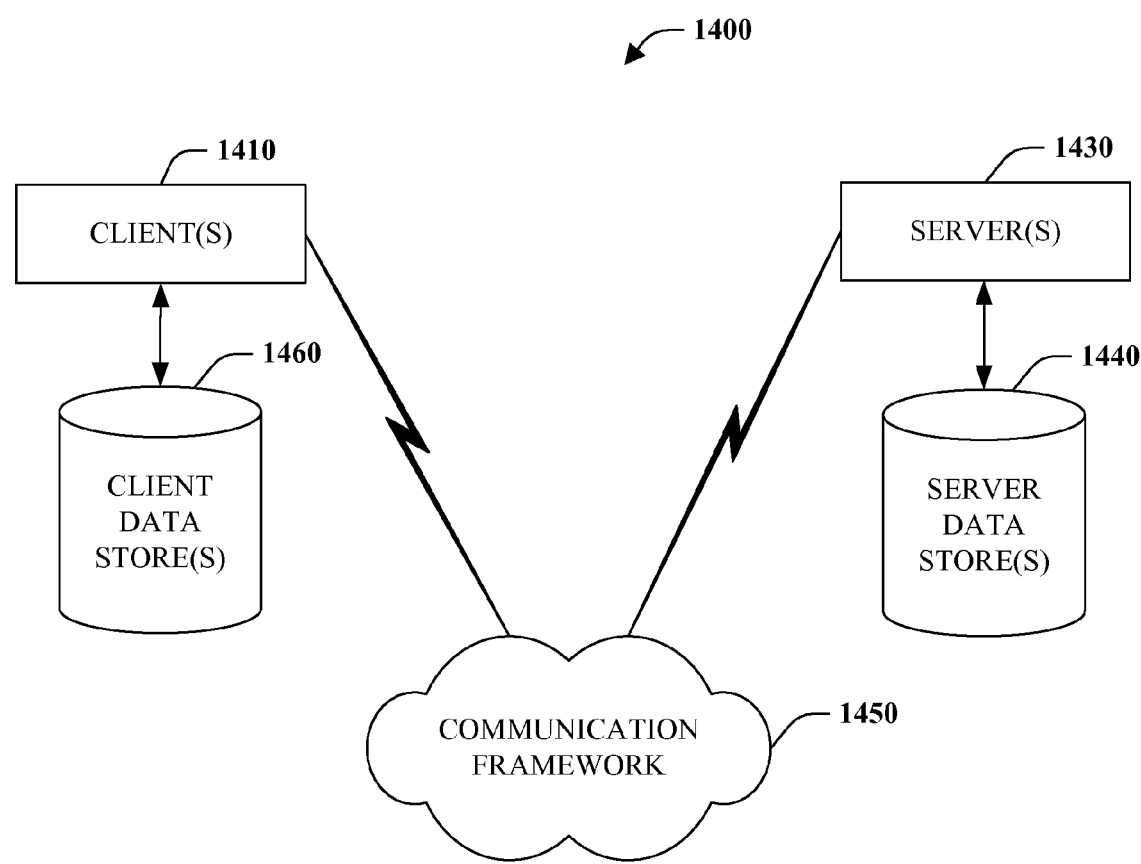
FIG. 14 is a schematic block diagram of a sample-computing environment.

In order to provide a context for the various aspects of the disclosed subject matter, FIGS. 13 and 14 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 13, an exemplary environment 1310 for implementing various aspects disclosed herein includes a computer 1312 (e.g., desktop, laptop, server, hand held, programmable consumer or industrial electronics . . . ). The computer 1312 includes a processing unit 1314, a system memory 1316, and a system bus 1318. The system bus 1318 couples system components including, but not limited to, the system memory 1316 to the processing unit 1314. The processing unit 1314 can be any of various available microprocessors. It is to be appreciated that dual microprocessors, multi-core and other multiprocessor architectures can be employed as the processing unit 1314.

The system memory 1316 includes volatile and nonvolatile memory. The basic input/output system (BIOS), containing the basic routines to transfer information between elements within the computer 1312, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1312 also includes removable/non-removable, volatile/nonvolatile computer storage media. FIG. 13 illustrates, for example, mass storage 1324. Mass storage 1324 includes, but is not limited to, devices like a magnetic or optical disk drive, floppy disk drive, flash memory, or memory stick. In addition, mass storage 1324 can include storage media separately or in combination with other storage media.

FIG. 13 provides software application(s) 1328 that act as an intermediary between users and/or other computers and the basic computer resources described in suitable operating environment 1310. Such software application(s) 1328 include one or both of system and application software. System software can include an operating system, which can be stored on mass storage 1324, that acts to control and allocate resources of the computer system 1312. Application software takes advantage of the management of resources by system software through program modules and data stored on either or both of system memory 1316 and mass storage 1324.

The computer 1312 also includes one or more interface components 1326 that are communicatively coupled to the bus 1318 and facilitate interaction with the computer 1312. By way of example, the interface component 1326 can be a port (e.g., serial, parallel, PCMCIA, USB, FireWire . . . ) or an interface card (e.g., sound, video, network . . . ) or the like. The interface component 1326 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer, and the like. Output can also be supplied by the computer 1312 to output device(s) via interface component 1326. Output devices can include displays (e.g., CRT, LCD, plasma . . . ), speakers, printers, and other computers, among other things.

FIG. 14 is a schematic block diagram of a sample-computing environment 1400 with which the subject innovation can interact. The system 1400 includes one or more client(s) 1410. The client(s) 1410 can be hardware and/or software (e.g., threads, processes, computing devices). The system 1400 also includes one or more server(s) 1430. Thus, system 1400 can correspond to a two-tier client server model or a multi-tier model (e.g., client, middle tier server, data server), amongst other models. The server(s) 1430 can also be hardware and/or software (e.g., threads, processes, computing devices). The servers 1430 can house threads to perform transformations by employing the aspects of the subject innovation, for example. One possible communication between a client 1410 and a server 1430 may be in the form of a data packet transmitted between two or more computer processes.

The system 1400 includes a communication framework 1450 that can be employed to facilitate communications between the client(s) 1410 and the server(s) 1430. The client(s) 1410 are operatively connected to one or more client data store(s) 1460 that can be employed to store information local to the client(s) 1410. Similarly, the server(s) 1430 are operatively connected to one or more server data store(s) 1440 that can be employed to store information local to the servers 1430.

Client/server interactions can be utilized with respect with respect to various aspects of the claimed subject matter. As previously mentioned, aspects of the subject matter can be divided across a client 1410 and a server 1430. In fact, the communication system can be embodied on a server 1430 wherein tagged and encrypted content is housed on one or more of the server data stores 1440. A plurality of clients 1410 can communicate with each other via the server 1430 across the communication framework 1450 and optimally anonymous channels (e.g., onion routing . . . ). Of course, the claimed subject matter is not so limited. Various aspects of the claimed functionality can also be embodied as a network or web service. For example, a web service can be employed to produce and/or retrieve a tagged communication.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A system that facilitates privacy-preserving communication, comprising:
   at least one processor;
   a credential verification component that evaluates anonymous credentials of a sender; and
   a storage component that persists uploaded data from the sender that includes anonymous tags that anonymously identify receivers to a secure data store if the anonymous credentials are valid, wherein the anonymous tags label the uploaded data and each of the anonymous tags anonymously identifies, to the system, at least a receiver that is permitted to download the uploaded data such that the system comprising the storage component that persists the uploaded data is unable to determine the identity of the receiver using the anonymous tag, wherein the privacy preserving communication is performed such that the identities of the sender and the receiver are not provided to the server.

2. The system of claim 1, further comprising a credential component that generates the anonymous credentials as a function of a commitment to a private key that corresponds to a particular public key.

3. The system of claim 2, wherein the credential component acquires the private and public key in a blinded form.

4. The system of claim 1, wherein the anonymous tags correspond to a commitment to an intended receiver public key in which randomness of the commitment is captured as a function of time and a seed produced by way of a non-interactive key agreement between the user and the receiver.

5. The system of claim 1, wherein the data is encrypted as a function of a secret seed associated with the user and the receiver.

6. The system of claim 1, further comprising an access component that enables retrieval of messages by tag from the secure data store, if the anonymous credentials are validated by the credential verification component.

7. The system of claim 6, further comprising a proof verification component that verifies that the user that seeks to retrieve a message presented a tag that is linked to the user.

8. The system of claim 7, wherein the credential verification component verifies that the tag was generated with the user's public key, that the user knows the corresponding private key, and that a presented credential is associated with the public and private key pair wherein verification is accomplished without revealing the user's public or private key.

9. The system of claim 1, the components form part of an active server that prevents sharing of download privilege without sharing of private key to discourage malicious usage.)

10. The system of claim 1, wherein the components form part of an anonymous communication server to which users connect over an anonymous channel.

11. The system of claim 1, wherein the components form part of a file exchange system.

12. A method of anonymous communication through a server, the method comprising:
   configuring a processor to perform:
   transforming data to an encrypted version thereof;
   labeling the encrypted data with an anonymous tag anonymously identifies an intended recipient such that a server to which encrypted and tagged data is uploaded is unable to determine the identity of the intended recipient using the anonymous tag; and
   uploading the encrypted and tagged data to the server, the server storing the data and regulating downloading thereof by a recipient, wherein the anonymous communication is performed such that the identities of a sender and the intended recipient are not provided to the server.

13. The method of claim 12, further comprising generating a seed by way of a non-interactive key agreement with the intended recipient and producing the anonymous tag as a function thereof.

14. The method of claim 13, further comprising computing the anonymous tag as a commitment to a public key associated with the intended recipient with randomness determined as function of the seed and a current time published by the server.

15. The method of claim 13, further comprising generating a key as a function of the seed and encrypting the data utilizing the key.

16. The method of claim 12, further comprising proving knowledge of an anonymous credential to the server to illustrate the sender is legitimate.

17. A method of anonymous communication acquisition in an anonymous messaging system, the method comprising:
   computing an anonymous tag as a function of a seed generated in accordance with a key agreement between a sender and a receiver of a communication;
   transmitting the anonymous tag of the receiver and an anonymous credential to a server, the anonymous tag being such that the server is unable to determine the identity of the receiver using the anonymous tag;
   acquiring an encrypted communication associated with the anonymous tag from the server, if the anonymous tag and anonymous credential are valid, wherein the anonymous tag labels the encrypted communication; and
   transforming the communication into a non-encrypted version thereof utilizing a key produced as a function of the seed, wherein the anonymous communication acquisition is performed such that the identities of the sender and the receiver are not provided to the server.

18. The method of claim 17, wherein computing the anonymous tag comprises computing a commitment to a public key associated with the receiver where commitment randomness is computed as a function of the seed and time.

19. The method of claim 18, further comprising proving to the server (a) the tag was generated using a requesting user's public key, (b) the requesting user has knowledge of a secret key that corresponds to the public key, and (c) the requesting user has the credential for the secret and public key pair, wherein proof is accomplished without revealing the user's public key or secret key to the server.

20. The method of claim 18, further comprising proving to the server that the requesting user has knowledge of the randomness employed in the commitment.

\* \* \* \* \*